United States Patent
Nakai et al.

(10) Patent No.: US 6,912,428 B2
(45) Date of Patent: Jun. 28, 2005

(54) SYSTEM FOR DEVELOPING AN APPLICATION SYSTEM AND IMPLEMENTING THEREOF

(75) Inventors: Satoru Nakai, Tokyo (JP); Eiji Hayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 422 days.

(21) Appl. No.: 09/845,361

(22) Filed: May 1, 2001

(65) Prior Publication Data

US 2001/0056306 A1 Dec. 27, 2001

(30) Foreign Application Priority Data

Jun. 21, 2000 (JP) ........................................ 2000-186410

(51) Int. Cl.$^7$ .............................................. G05B 11/01
(52) U.S. Cl. ............................ 700/18; 700/86; 700/21; 715/763; 715/771; 715/776; 715/809; 715/866; 710/15; 710/302
(58) Field of Search .............................. 700/18, 86, 21; 345/763, 771; 710/302, 15; 715/763, 771, 809, 866, 776, 762

(56) References Cited

U.S. PATENT DOCUMENTS

| | | | |
|---|---|---|---|
| 4,796,179 A * | 1/1989 | Lehman et al. ............... | 700/86 |
| 5,355,062 A | 10/1994 | Takizawa et al. ......... | 318/568.1 |
| 5,392,207 A | 2/1995 | Wilson et al. .......... | 364/167.01 |
| 5,565,748 A | 10/1996 | Takizawa et al. ......... | 318/568.1 |
| 5,586,335 A | 12/1996 | Utan ........................... | 364/147 |
| 5,623,592 A * | 4/1997 | Carlson et al. ............. | 345/866 |
| 6,173,438 B1 * | 1/2001 | Kodosky et al. ............ | 717/109 |
| 6,279,049 B1 * | 8/2001 | Kang .......................... | 710/15 |

* cited by examiner

Primary Examiner—Anthony Knight
Assistant Examiner—Thomas Pham
(74) Attorney, Agent, or Firm—Leydig, Voit & Mayer, Ltd.

(57) ABSTRACT

A system for developing application systems and implementing the system for an automated machine, which can reduce the burden of installing the peripheral devices with a controller. The system includes a controller, a monitor connected with the controller, and at least one object to be controlled. The object is connected to the controller. The control system further includes developing a program for the controlled object, implementing the program developed, and a software module uniquely assigned to the object. The software module provides at least one of an icon procedure for displaying an icon for the object in a display area on the monitor, a description procedure for describing a control process for the object, and an implement procedure for implementing the control process developed for the object.

12 Claims, 10 Drawing Sheets

SYSTEM FOR DEVELOPING AN APPLICATION SYSTEM AND IMPLEMENTING THEREOF

BACKGROUND OF THE INVENTION

1. Technical Field of the Invention

The invention relates to a system for developing an application system and implementation thereof for an automated machine.

2. Description of Related Arts

Various types of controllers such as a programmable logic controller (PLC) and a motion controller have been utilized to configure well-known automated machines including, for example, machine tools in the art of factory automation, industrial automated machines such as industrial robots, self-controlled robots, and typical automated machines. Further, the controller is connected with various types of input devices including a sensor and a switch for inputting signals thereto, also with many kinds of output devices including a motor and a display to be controlled thereby. Also, a program in the form of software describing commands (instructions) for the input and output devices (i.e., I/O devices) is installed in the controller. The automated machines are operated upon receiving the commands described in the software program.

As indicated above, the input and output devices are connected to Input/Output connectors (i.e., I/O ports) of the controller. In case where the conventional controller is utilized, first of all, a programmer of a controller needs to precisely recognize which of the I/O ports is connected with which one of I/O devices, and then sets up software modules or operation programs for I/O devices implemented within the controller. Otherwise, the controller can not send appropriate commands to the I/O devices so that the controller fails to control the I/O devices. Such software modules include, for example, a device driver.

The aforementioned disadvantage has not been solved up to the last couple of years, in which an expansion card and a peripheral device are connected with a conventional PC (personal computer). Such a peripheral device is also referred to as an object to be controlled or simply as an object. The user must exactly understand the connections between I/O ports located on the PC and peripheral devices, then, the user may properly install software modules and/or operation programs for the I/O devices to be executed with the PC.

Meanwhile, another type of the interface has recently been developed with a concept of "Plug and Play (PnP)" for connection between the PC and the peripheral devices. The above-mentioned PnP interface is, for example, "USB (Universal Serial Bus)" or "IEEE 1394 (Institute of Electrical and Electronics Engineers 1394)" standards. In fact, use of the PnP interface reduces a burden of the user. Each of peripheral devices having the PnP interface is assigned a unique identification, named "GUID (Global Unique ID)".

As described above, the GUID identification is globally unique and individually assigned to each object. Suppose that the PC has already stored a predetermined number of software modules such as device drivers for driving corresponding objects. Once the I/O object is connected with the PC, the PC acquires the GUID of the I/O object. Then, the PC automatically identifies the corresponding software module according to the GUID so as to drive the I/O device. Therefore, this eliminates the need for the user to select and set up a suitable software module such as a device driver. To this end, the user may not even be aware of the fact that the software module is installed within the PC, while the user can connect with the I/O device to utilize it. Yet, even though the user has to input and store the option parameters of the software module, this task may also be avoided if the predetermined initial values thereof are used.

Also, the standards of USB and IEEE 1394 have another function based upon the concept of "Hot Plug". The conventional PC is required to shut down and be rebooted to activate a software module that is newly installed for an additional device. The Hot Plug enables the user to connect another device to the PC without shutdown so that almost no task is required for connecting the device with the PC. Thus, the user undertakes much less burden than that in utilizing the conventional PC.

The PnP interface such as the USB and/or IEEE 1394 standards has another feature. That is, the communication protocol of the PnP interface is open to the public. In other words, the communication protocol thereof is public. This allows various third parties to develop peripheral devices for the PC. Connection of the conventional PC with a peripheral device requires an expansion board, such as a particular connecting board, for connecting therebetween, however, the feature of publicity eliminates this trouble.

The aforementioned feature of publicity is realized in the communication protocol between the PC and the peripheral device. Besides, demand has been increased so that the feature of publicity is realized on the communication protocol between the controller and the peripheral device. Various controllers have been proposed such that they include interfaces such as the USB and/or IEEE1394 standards with the feature of the publicity.

As described above, the recent controllers and PCs are going to support the PnP interface such as USB and/or IEEE 1394 standards. However, the feature of the Plug and Play has not yet been exploited effectively enough to utilize the device instantly after connecting it to the PC or the controllers.

Firstly, the operation of the peripheral device (object) controlled by the PC is described hereinafter. When the user, for example, moves a typical mouse as a peripheral device, a mouse cursor moves on the monitor in accordance with the actual movement of the mouse. Thus, the operation of the mouse cursor is preprogrammed and unmodified with the mouse and the PC. A USB camera is another example as the peripheral device, in which a particular software program for displaying images, taken by the USB camera, on the PC monitor is distributed with the USB camera by the manufacturer thereof. The USB camera cannot be operated without using the software program. To this end, the operation manner of the peripheral devices and the operation environment of the PC are fixed and cannot be modified by the user (through instruction with program codes).

Secondly, the operation of the peripheral device (object) controlled by the controller is described hereinafter. Inherently, the operation of the object connected with the controller needs to be preprogrammed within the controller through the program codes. In other words, the controller cannot drive the device, immediately after simply connecting the device with the controller by nature, unless the controller has been installed with program codes for the object.

Furthermore, even if the controller is adapted to use the interfaces such as USB or IEEE 1394 standards, the controller has to be installed with the software module or the operation program implementing it, precisely as on the conventional controllers. Therefore, the advantage of the "Plug and Play" feature cannot be sufficiently exploited in those circumstances.

The present invention is intended for use of a system for configuring a automated machine comprising peripheral devices (object) and controllers with PnP interfaces (i.e., having the feature of Plug and Play).

SUMMARY OF THE INVENTION

The first object of the invention is to provide the system for developing application systems and implementing thereof, which can reduce the burden of the user to install the peripheral devices with a controller.

The second object of the invention is to provide the system, which can be installed with various control programs including, for example, a procedure program, an event driven program and a motion program in a simple manner.

A system according to first aspect of the present invention comprises: a controller; a monitor connected with the controller; at least one object to be controlled, the object connected with the controller; development means for developing a program for the controlled object; implement means for implementing the program developed by the development means; and a software module uniquely assigned to the object, the software module being in a form of software providing at least one of procedures including, an icon procedure for displaying an icon for the object in a display area on the monitor, a description procedure for describing a control process for the object, and an implement procedure for implementing the control process developed for the object.

The software module is uniquely assigned to the object with a particular ID such as a global unique ID (GUID) so that the contents of the device drivers (the software modules of the object to be controlled) can be distinctly identified with the unique ID.

Further, according to the system of the present invention, the object includes at least one device from which the development means acquires a global unique ID or another similar data thereto, and the development means identifies the software module with the global unique ID or another similar data thereto.

Since the software module is uniquely assigned to the object with a particular ID such as a global unique ID (GUID), the contents of the device drivers (the software modules of the object to be controlled) can be distinctly identified with the unique ID.

Further, according to the system of the present invention, the software module is stored within the object so that the development means acquires the software module from the controlled object.

Therefore, the system is not required to have a memory capacity to store all software modules for the objects to be connected thereto.

Further, according to the system of the present invention, the software module is stored within a database server connected with the development means through a communication bus so that the development means acquires the software module from the database server.

Therefore, the system is not required to have a memory capacity to store all software modules for the objects to be connected thereto.

Also, all software modules are stored in the database server so that a unitary management for software modules can be realized in a simple manner.

Further, according to the system of the present invention, the development means provides a display area on the monitor, in which at least one icon is displayed, the icon representing for the object connected to the controller or the object to be connected to the controller.

Therefore, the user (programmer) can develop the program in a simple manner and easily understand the developed program.

Further, according to the system of the present invention, the icon procedure displays a plurality of icons in the display area on the monitor, each icon illustrating a current status of the object.

Therefore, the user (programmer) can recognize the current status of the object by watching the icons on the monitor.

Further, according to the system of the present invention, the development means provides a development area on the monitor, and the user copies the icon from the display area onto the development area, thereby to develop the program.

Therefore, the user (programmer) can develop the program in a simple manner and easily understand the developed program.

Further, according to the system of the present invention, the user utilizes the description procedure for describing a control process for said object determining an operation of said object, thereby to develop the program.

Therefore, various operations of the object can be programmed with the description procedure in developing the program.

Further, according to the system of the present invention, the icon procedure displays a plurality of icons in the display area on said monitor, each icon illustrating an operation of said object.

Therefore, the user (programmer) can develop the program in a simple manner and easily understand the developed program.

Further, according to the system of the present invention, the user connects a plurality of the icons with each other to form a flowchart in the development area, thereby to develop the program.

Therefore, the user (programmer) can develop the program in a simple manner and easily understand the developed program.

Further, according to the system of the present invention, the development means displays the icons in the display area, and simulates the operation of the object while the program is simulated, whereby the monitor is used for displaying the simulation thereof.

Therefore, the user can watch the flow of the simulation of the program.

Further, according to the system of the present invention, the development means displays the icons in the display area, illustrates the operation of the object while the implement means implements the program, whereby the monitor is used for displaying the operation thereof.

Therefore, the user can watch the flow of the operation of the program.

Further, according to the system of the present invention, the program to be implemented by the implement means sends messages to and/or receives messages from the object.

Therefore, the user can develop the program in view point of the object-oriented system development. Thus, the user (programmer) can develop the program in a simple manner and easily understand the developed program.

Further, according to the system of the present invention, the object is connected with the controller through an interface serving functions including a Plug and Play function or a Hot Plug function.

Therefore, the user can configure the application system for automated machines, exploiting the functions such as a Plug and Play function or a Hot Plug function.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention become more fully understood from the detailed description given hereinafter and accompanying drawings which are given by way of illustration only, and thus are not limitative of the present invention and wherein.

DETAILED DESCRIPTION OF THE PREFERRED EMBODIMENTS

Referring to the accompanying drawings, systems according to the preferable embodiments of the present invention are described hereinafter.

Embodiment 1

Figure 1:
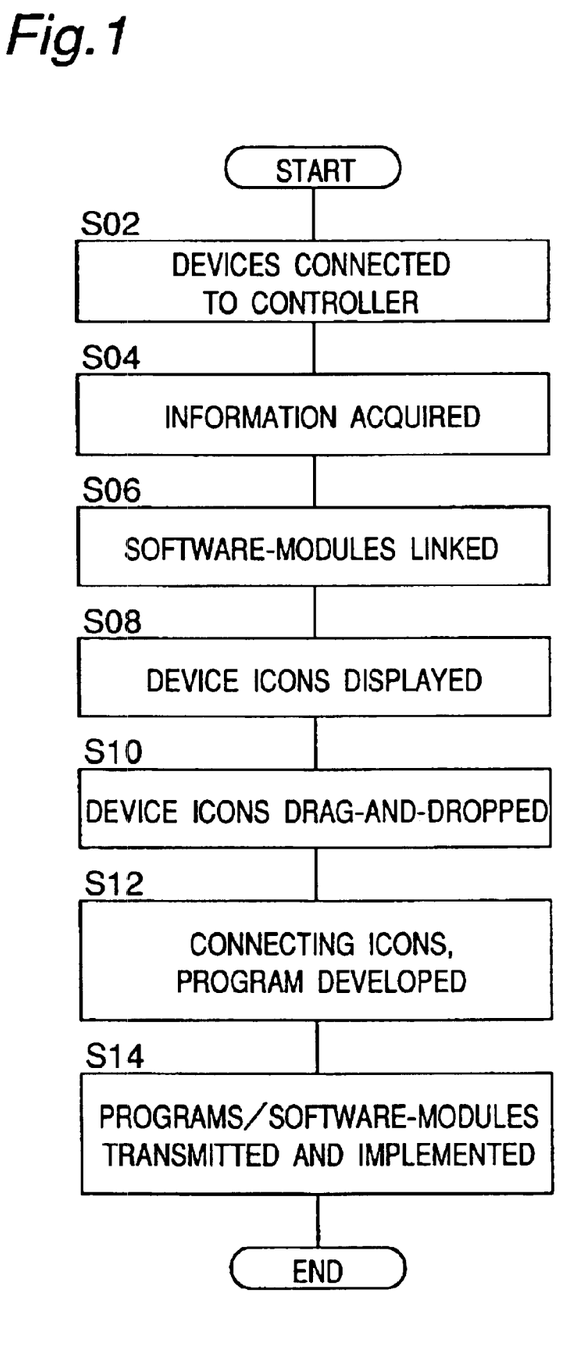
FIG. 1 is a flowchart of a procedure according to Embodiment 1 of the present invention, showing a series of steps to configure an application system for an automated machine.

FIG. 1 shows a procedure according to Embodiment 1 of the present invention, showing a series of steps to configure an application system for an automated machine. The series of steps are described in detail hereinafter.

In the step S02 shown in FIG. 1, prior to the configuration of the application system, the automated machine is assembled by connecting a peripheral device (object to be controlled) with a controller.

Figure 2A:
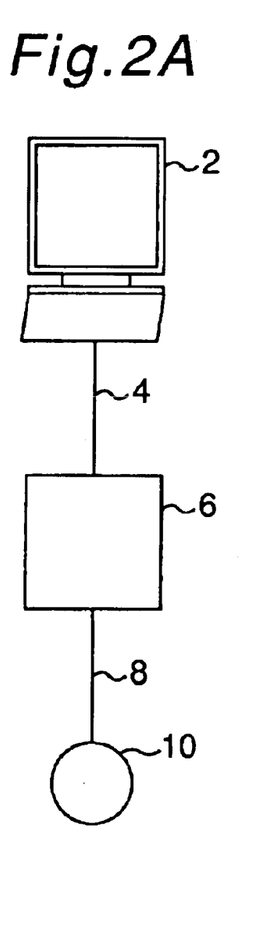
FIGS. 2A through 2C are block diagrams showing a structure of the system comprising a PC, a controller and a peripheral device (object to be controlled)

FIG. 2A shows that the controller 6 is connected with a programming device 2 for developing programs and the peripheral device 10 through a first and second connecting means 4 and 8, respectively. Typically, the programming device 2 is a PC (personal computer). The PC contains an operating system, which includes, in general, the "Windows 98", the "Windows NT" and the "Windows 2000" available from Microsoft Corp. Alternatively, the operating system may be the "Mac OS" available from Apple Computer, Inc. or "Linux". Additionally, the programming device 2 may be a game machine connectable with a television set, or a game machine having a display monitor (e.g. a potable game machine).

Figure 2B:
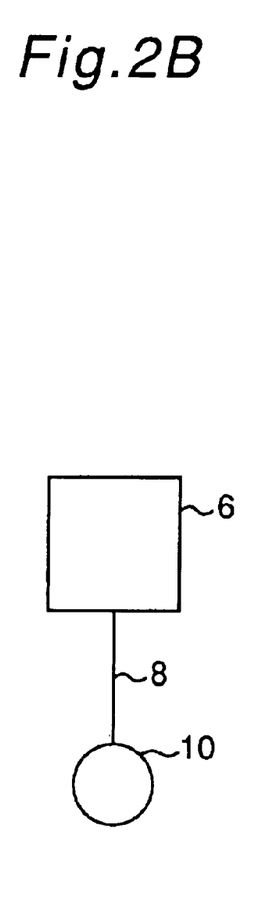
Figure 2C:
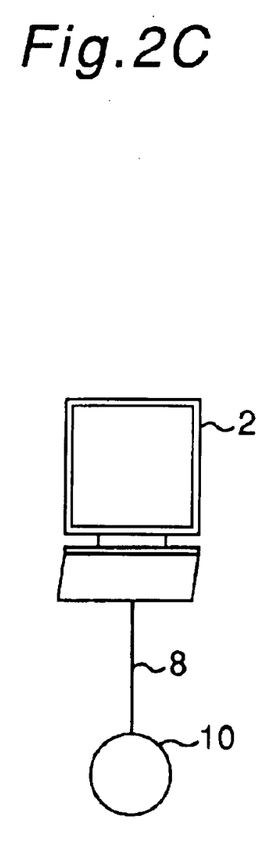

On the other hand, as shown in FIG. 2B, the programming device 2 may be incorporated into the controller 6. The controller 6 illustrated in FIG. 2B also has the function of the programming device 2. In this instance, it is preferable that the controller 6 includes the display monitor and the command buttons utilized for developing programs. When the display monitor has the function as a touch panel, the controller 6 may eliminate the command buttons. Alternatively, as shown in FIG. 2C, the controller 6 is incorporated into the programming device 2. In this case, the programming device 2 has the function of the controller 6.

The communication methods of first and second connecting means 4, 8 may be the same as or different from each other. The communication methods may be utilized with cable communications such as USB and IEEE1394 standards, or radio communications such as Bluetooth and IrDA standards.

Next, in the step S04 shown in FIG. 1, the programming device 2 acquires information with regard to the peripheral device 10 through second connecting means 8, the controller 6 and the first connecting means 4. Each of the peripheral devices 10 has the identification named the GUID (Global Unique Identification Data) for identifying the manufacturer and the specification thereof. The device 10 may have another form of the data similar to the GUID. The GUID (or the data similar thereto) is stored in the memory (not shown) of the peripheral device 10 to be controlled. Then, a program development environment 20, as will be described with reference to FIG. 3, retrieves the GUIDs. This allows the program development environment 20 to have information about the manufacturer and the model of the peripheral device 10 connected to the controller 6.

Next, in the step S06 shown in FIG. 1, the program development environment 20 links with a device driver for the peripheral device 10. The program development environment 20 accesses a database storing device drivers for all available peripheral devices 10 (objects). Thus, the program development environment 20 utilizes the GUID to select device drivers of the peripheral device 10 and links therewith. Alternatively, the program development environment 20 brings the device drivers therein, for example, by copying or downloading the device drivers. Device drivers may be provided with the program development environment 20 in the form of the DLL (dynamic link library).

Figure 3:
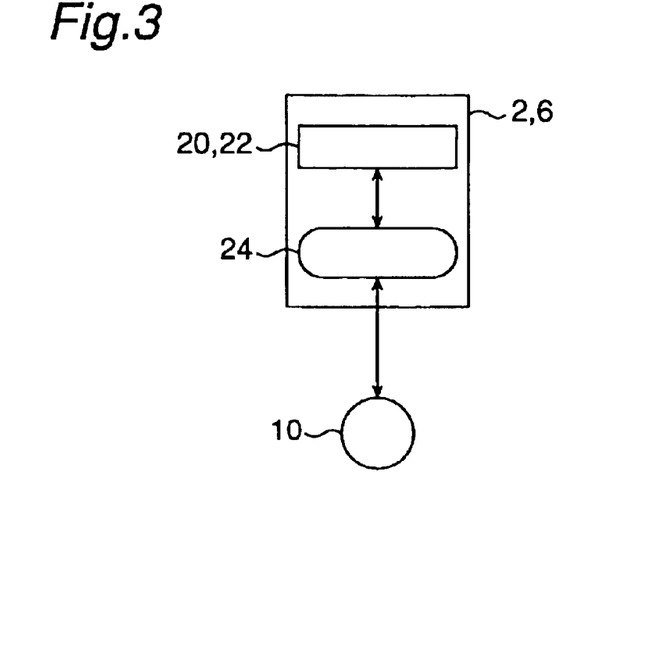
FIG. 3 is a block diagram showing a software architecture according to Embodiment 1 of the present invention.

FIG. 3 shows a software architecture according to Embodiment 1 of the present invention. The software architecture comprises the program development environment 20, the program implement environment 22, and the device driver 24 for the peripheral device (object) 10. FIG. 3 illustrates the controller 6 serving the function of the programming device 2 as shown in FIG. 2B. However, the programming device 2 may be individual to the controller 6 as shown in FIG. 2A, in which the programming device 2 serves as the program development environment 20, and the controller 6 serves as the program implement environment 22. The programming device 2 used for developing programs may serve also as the program implement environment 22 so as to simulate programs during developing programs.

The device driver 24 serves a plurality of procedures including, a display procedure for displaying an icon with the program development environment 20, a description procedure for describing one or more processes to control the device, an implement procedure for implementing the process to control the device (object) 10 with the program implement environment 22, a communication procedure for communicating the peripheral device 10 with the controller 6 in a communication method, for example, USB and IEEE1394.

Figure 4A:
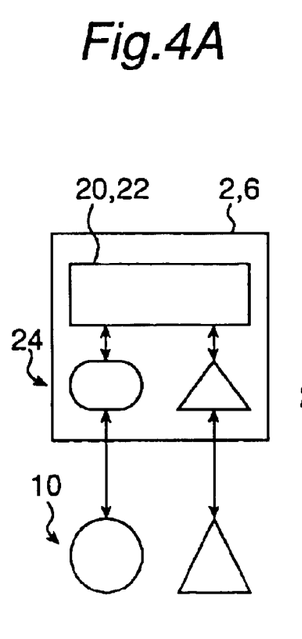
FIGS. 4A through 4C are block diagrams showing another software architecture including a plurality of peripheral devices according to Embodiment 1 of the present invention.
Figure 4B:
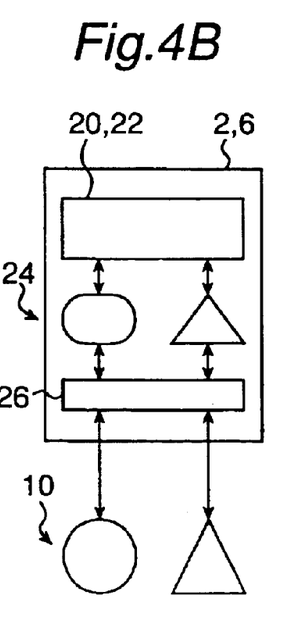
Figure 4C:
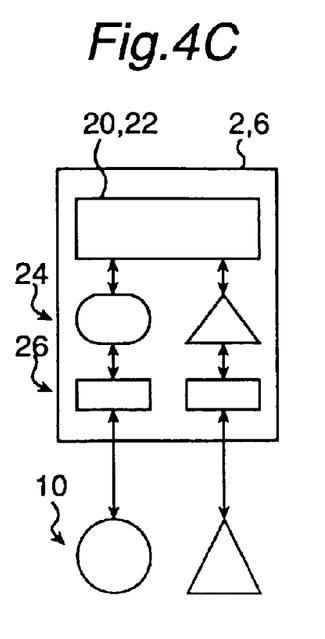

FIG. 4A shows the software architecture including two independent peripheral devices 10 connected to the controller 6 (and the programming device 2). As described above, the program implement environment 22 may also include the communication procedure 26 for communicating peripheral devices 10. If the two peripheral devices 10 utilize the same kind of interface (communication method), for instance, both of them are USB devices, they can share only one communication procedure 26 as shown in 4B. Meanwhile, if the interfaces of the peripheral devices 10 are different from each other, for instance, one of them is a USB device and the other is an IEEE1394 device, each of peripheral devices 10 utilizes corresponding separate communication procedures 26, as shown in FIG. 4C.

Figure 5A:
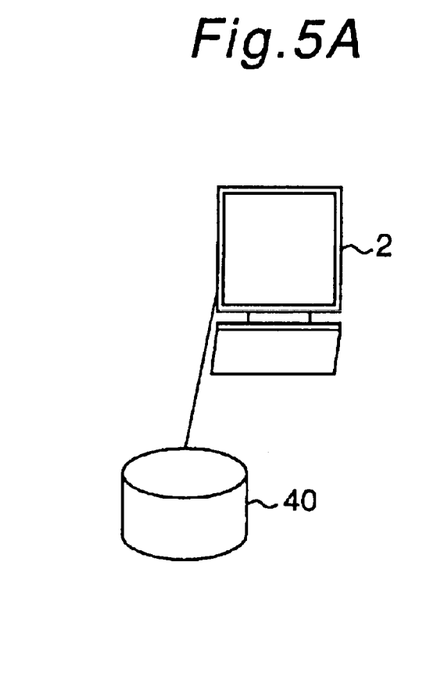
FIGS. 5A through 5C are block diagrams showing connections to a database of software modules.
Figure 5B:
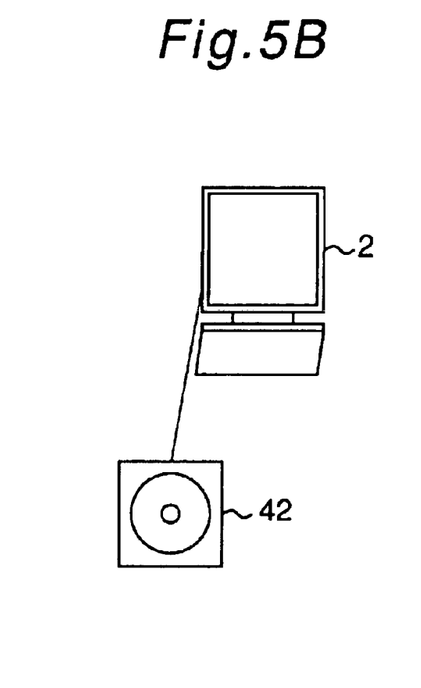
Figure 5C:
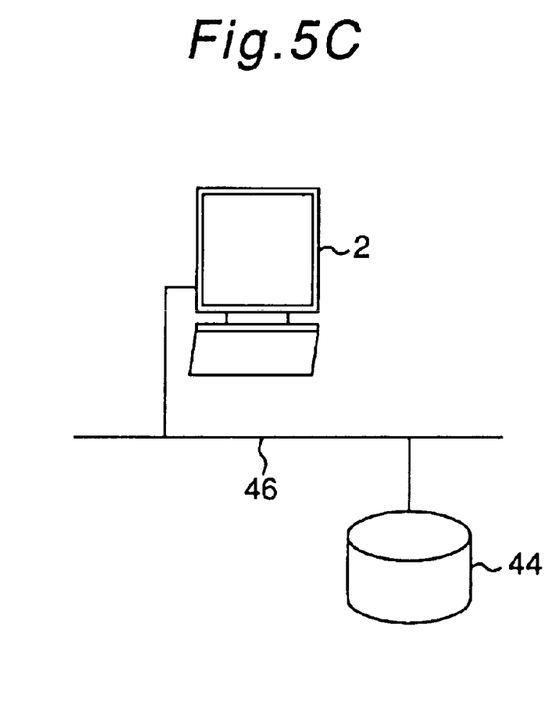

Preferably, the database storing device drivers for all available peripheral devices (object) 10 may be stored within the programming device 2 as shown in FIG. 5A. In particular, the database is configured within the hard disk 40 in the PC 2. Also, the database may be stored on the external storage medium 42 outside the programming device 2 as shown in FIG. 5B. The external storage medium 42 includes, for example, a CD-ROM, a DVD-ROM, and a storage medium of the game software, which are accessible by the PC 2. Alternatively, the database may be stored within a remote server (for example, within the database memory section 44 of the server as shown in FIG. 5C). In this instance, the database can be accessed through the bus 46 such as LANs or the Internet.

Each peripheral device 10 may provide its own device drivers 24 with the controller 6. That is, each peripheral device 10 includes not only the GUID but also the device drivers 24. Then, the program development environment 20 may acquire the device drivers 24 directly from the peripheral device 10 connected thereto. This eliminates the access to the database storing device drivers. However, the peripheral device 10 is required to have a memory capacity large enough to store the device driver 24 as well as the GUID.

Next, in the step S08 shown in FIG. 1, an icon 68 illustrating the device are displayed on the device display area 66 of the program development environment 20. If the device driver 24 has a particular icon, the icon is displayed thereon.

Figure 6A:
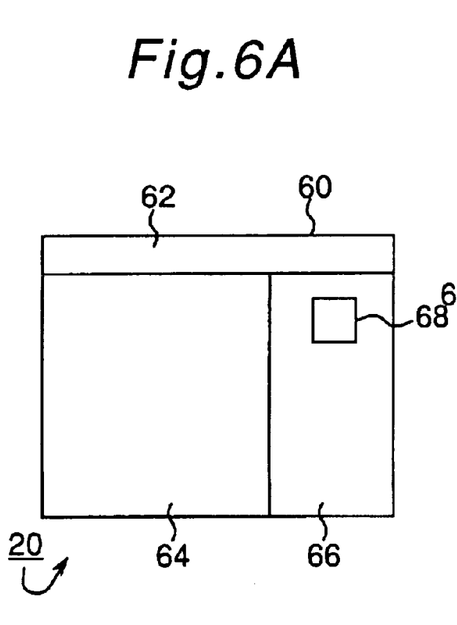
FIGS. 6A through 6C are schematic views of a program development environment.
Figure 6B:
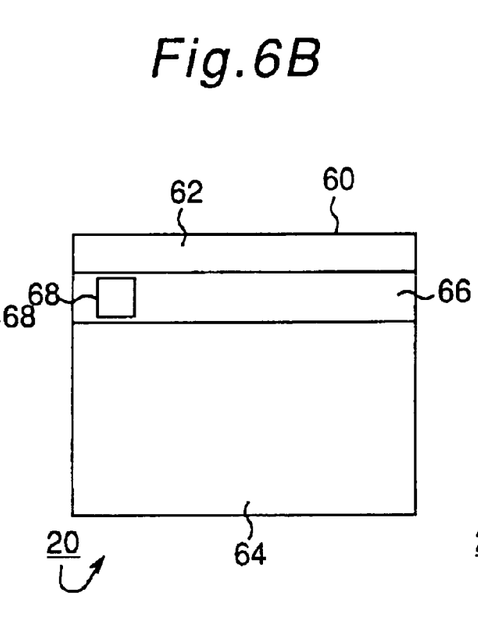
Figure 6C:
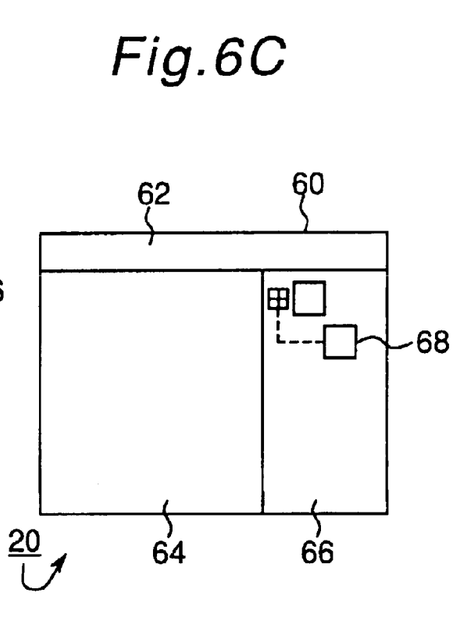

As illustrated in FIGS. 6A through 6C, the program development environment 20 (the programming device 2) according to the present invention comprises a monitor 60, which includes a tool bar 62 for executing basic operations of the program development environment 20, a program developing area (window) 64, and the device display area 66. The user can develop the program in a simple manner by copying and/or connecting icons 68 of the peripheral devices 10 onto the program developing area 64. The device display area 66 is utilized to display, in a form of icons, the peripheral devices 10 used in the application system for the automated machine. The device display area 66 may take either one of forms including a window, a tool bar and a tree-view as illustrated in FIGS. 6A, 6B and 6C, respectively.

Next, in the step S10 shown in FIG. 1, the user drags the device icons 68 on the device display area 66 and drops thereof onto the program developing area 64. That is, the device icons 68 displayed on the device display area 66 are newly copied on the program developing area 64. The program development environment 20 may preferably include another display area (not shown) for various control commands, also in a form of icons including, for instance, a branch command, a repeat command, an interrupt command, which are essential to develop programs. Besides, icons for control commands that are necessary for developing the program are also drag-and-dropped (newly copied) onto the program developing region 64.

Next, in the step S12 shown in FIG. 1, the user develops the program by connecting a plurality of icons displayed on the program developing area 64, so that the controller 6 implements the program. In order to connect icons, the user may locate one icon adjacent to another icon, alternatively, the user may join two icons with a line in accordance with a form of the flowchart.

Figure 7A:
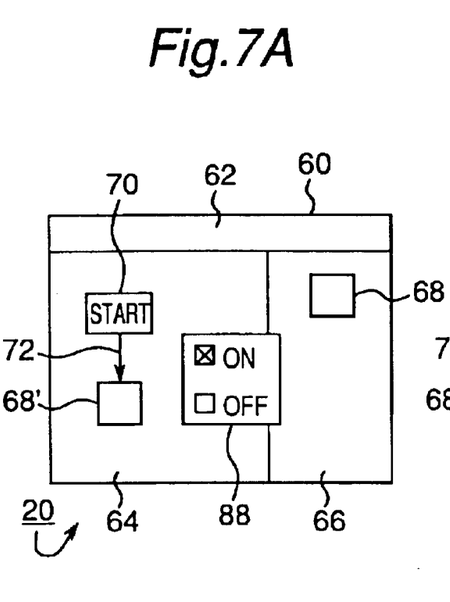
FIGS. 7A and 7B are schematic views of the program development environment during developing programs.
Figure 7B:
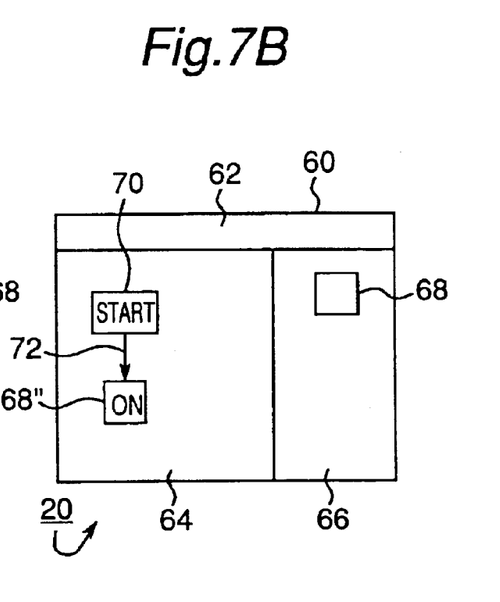

As illustrated in FIGS. 7A and 7B, in the program development environment 20 according to the present invention, the monitor 60 also comprises a program developing area 64, including the device icon 68' copied from the device display area 66, a start icon 70 which is one of the control icons indicating the start of the program, an arrow 72 connecting the start icon 70 with the device icon 68' in accordance with a form of the flowchart, and a dialogue box (or the application software) 88 to describe the operation of the device icon 68'.

A double click on the device icon 68' opens the dialogue box 88 thereof. If the device driver 24 includes the description procedure for describing one or more processes to control the peripheral device 10, the dialogue box 88 according to the description procedure is appeared. In order to complete description of the process, the user needs to arrange the icons 68' and set up the process on the dialogue box 88. Thus, after a plurality of the device icons 68' are copied (drag-and-dropped) from the device display area 66 onto the program developing area 64 and are connected to each other (i.e. after completing the arrangement of the icons), the process may be configured on the dialogue box 88 that is opened by a double-click on the device icon 68'. Alternatively, after the processes are configured on the dialogue box 88, a plurality of the device icons 68' may be connected to the others. If the device driver 24 has a plurality of icons in response with the device operations and/or the present condition of the peripheral device 10, the icon 68" displaying the present operation and/or the condition of the device is appeared as shown in FIG. 7B.

Preferably, a particular application software is utilized to describe the process of the device icon 68', so that the user can program the more sophisticated operations of the peripheral devices 10.

Finally, in the step S14 shown in FIG. 1, the developed programs and the device drivers 24 are transmitted to and implemented within the program implement environment 22. However, if the program implement environment 22 includes the communication procedure 26, a portion of the device drivers 24 corresponding thereto need not be transmitted. To this end, only the required portion of the device drivers 24 is transmitted from the program development environment 20 to the program implement environment 22.

The controller 6 may have a display device for displaying the progress of the programs. In this case, the icons 68, 68' and 68" can be displayed in response with conditions of the peripheral device 10 on the display device of the controller 6 by transmitting to the controller 6.

As can be seen from the above, the operations of the program development environment 20 and the program implement environment 22 in accordance with Embodiment 1 are written with the program codes adapted for the computer control. These program codes are stored and implemented on the memory (not shown) and the processor (not shown) of the computer, respectively. These program codes may be stored on the external storage medium such as a CD-ROM.

Various advantages according to Embodiment 1 are obtained as indicated hereinafter.

The first advantage is that the program development environment 20 is automatically linked with the device drivers 24 for the peripheral devices 10 connected thereto. Therefore, the user can eliminate the bothersome task for developing the program so as to operate the peripheral devices 10. In other words, no other setting is required, which is for example, connection of the appropriate interface between the controller 6 and the peripheral devices 10. To this end, the user can develop the program for controlling the peripheral devices 10 with the "Plug and Play" function in a simple manner.

Another advantage is that since the user can access only the peripheral devices 10, which can be programmed, the programming errors can be precluded. Most of the detailed software for the peripheral devices 10 are encapsulated within the device driver 24. Therefore, the user can configure the large scale of the application system only by linking the device driver 24 for the various peripheral devices 10 of which operation has evaluated, without knowledge as to the coded content of the device driver 24. The user is required to understand only the functions achieved by the device drivers 24 and the option parameters used therefor. Since the user sets the option parameters only, thereby to substantially reduce the risk, in which the data of inconsistent or irrelevant data-types, and/or the control signals are used in error.

As described above, the user can develop the program with basic operations such as drag-and-drops of the device icons 68 and connections thereof in accordance with a form of the flowchart. Therefore, in addition to the advantage that the user can develop the program in a simple manner, the developed program can readily be comprehended by another persons. Displaying various icons on the monitor 60 in response to the configuration and conditions of the peripheral devices 10 facilitates the user to understand the developed programs.

Embodiment 2

Figure 8:
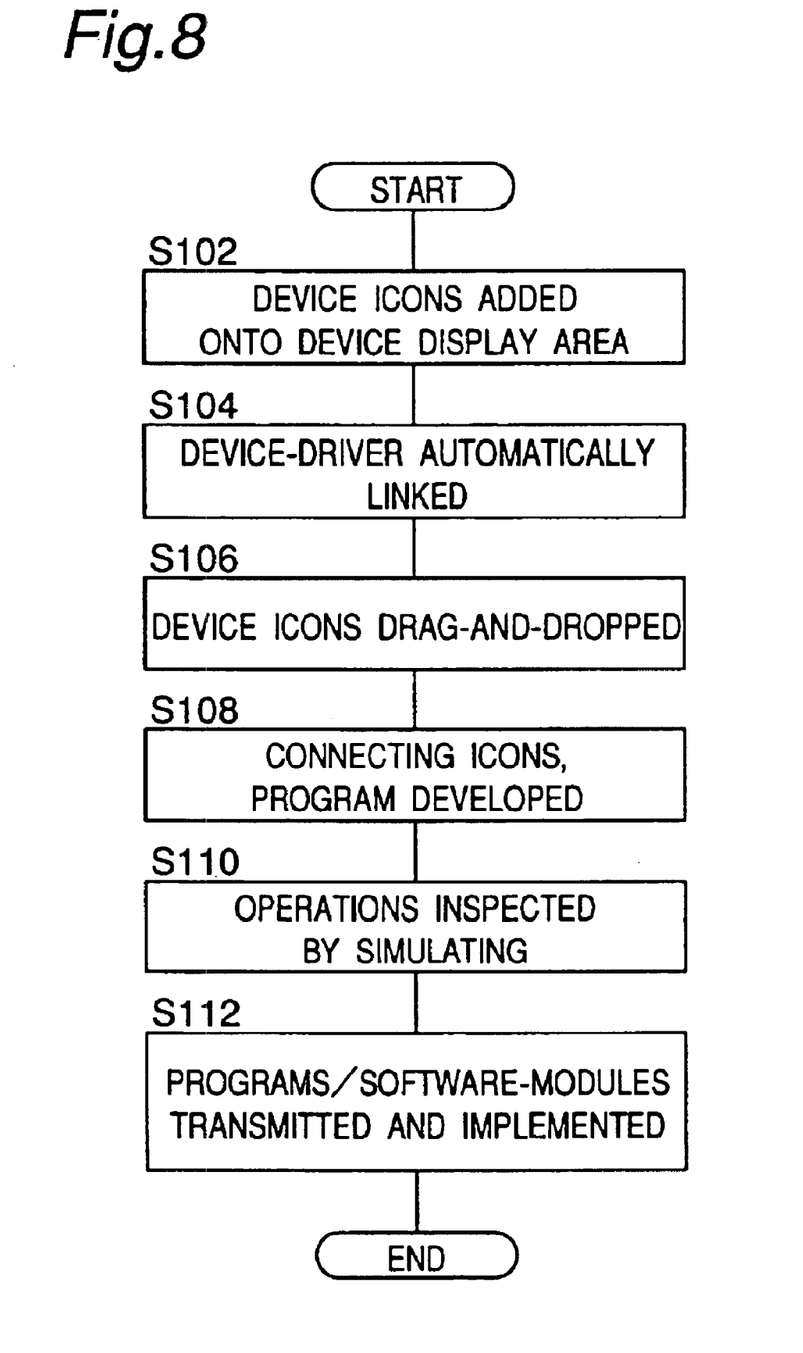
FIG. 8 is a flowchart of a procedure according to Embodiment 2 of the present invention, showing a series of steps to virtually configure an application system for an automated machine.

FIG. 8 shows a procedure according to Embodiment 2 of the present invention, showing a series of steps to configure an application system for an automated machine in a virtual manner. The series of steps are discussed in detail hereinafter.

In order to develop the application system in a virtual manner, firstly, in the step S102 shown in FIG. 8, the automated machine is virtually "assembled" within the device display area 66. In other words, the device icons 68 are added onto the device display area 66.

Figure 9A:
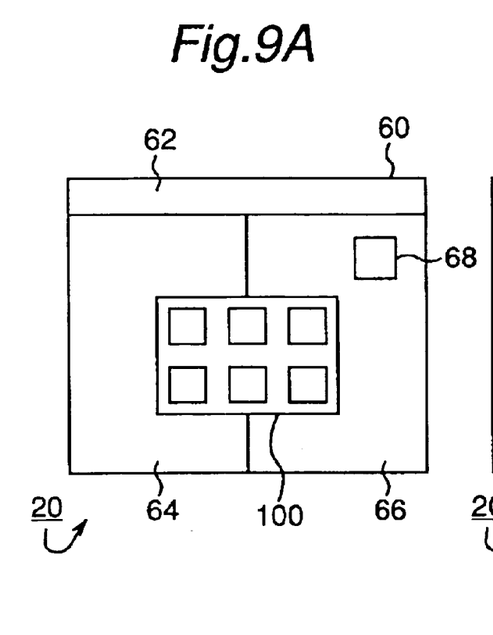
FIGS. 9A and 9B are schematic views of a virtual program development environment.
Figure 9B:
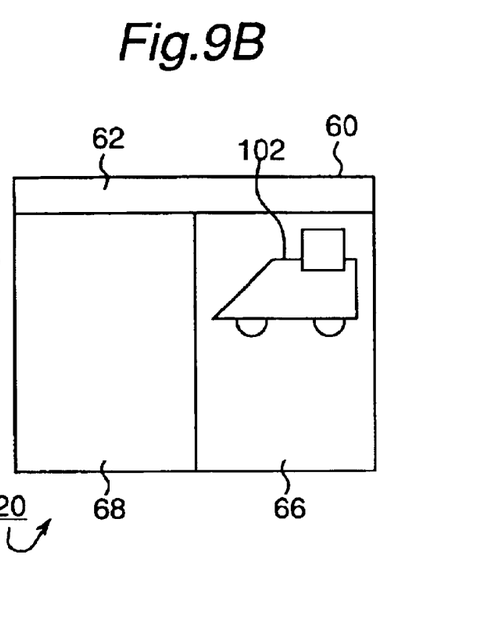

As illustrated in FIGS. 9A and 9B, the program development environment 20 according to the present invention comprises a monitor 60, which includes a tool bar 62 for executing basic operations of the program development environment 20, a program developing area (window) 64, and the device display area 66. The program development environment 20 according to Embodiment 2 may be substantially the same as one according to Embodiment 1 as shown in FIG. 6A. Also, as shown in FIG. 9A, the program development environment 20 according to Embodiment 2 includes a device dialog box 100 for displaying all of the icons of the available peripheral devices 10 thereon. The user can select the device icons 10 within the device dialog box 100 and add them in the device display area 66. The database storing device drivers 24 for all available peripheral devices (object) 10 may be substantially the same as one as illustrated in FIGS. 5A through 5C.

As discussed above, only addition of the device icons 68 in the device display area 66 is required in order to configure the virtual application system for the automated machine. Further, as shown in FIG. 9B, a picture (an image) 102 may also be added in the device display area 66 for facilitating the user to clearly understand the application system to be programmed.

In the step S104 shown in FIG. 8, the device drivers 24 for the peripheral devices 10 are automatically linked with the program development environment 20 when the device icons 68 are added in the device display area 66. According to Embodiment 1, the controller 6 receives the GUIDs of the peripheral devices 10 connected thereto so that the program development environment 20 can identify the peripheral devices 10 based upon the GUIDs. Thus, the program development environment 20 links with the device drivers for the peripheral devices 10 connected to the controller 6. Meanwhile, according to Embodiment 2, the user selects the device icons 68 for the desired peripheral devices 10 from all device icons 68 displayed on the monitor 60. Thus, the program development environment 20 links with the device drivers 24 for the selected peripheral devices 10 without receiving the GUID. To this end, the program development environment 20 according to Embodiment 2 automatically links with the device drivers 24 in substantial the same manner as one according to Embodiment 1 does.

Next, in the step S106 shown in FIG. 8, the user drags the device icons 68 located on the device display area 66 and drop thereof onto the program developing area 64. In the step S108 shown in FIG. 8, in turn, the user develops the program by connecting a plurality of icons displayed on the program developing area 64, so that the controller 6 implements the program. Thus, the manner how to develop the program according to Embodiment 2 is substantially the same as one according to Embodiment 1 as well.

Figure 10A:
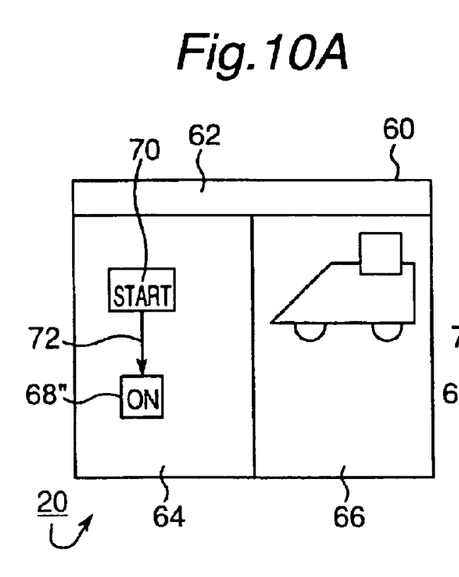
FIGS. 10A and 10B are schematic views of a virtual program development environment during developing and simulating programs.
Figure 10B:
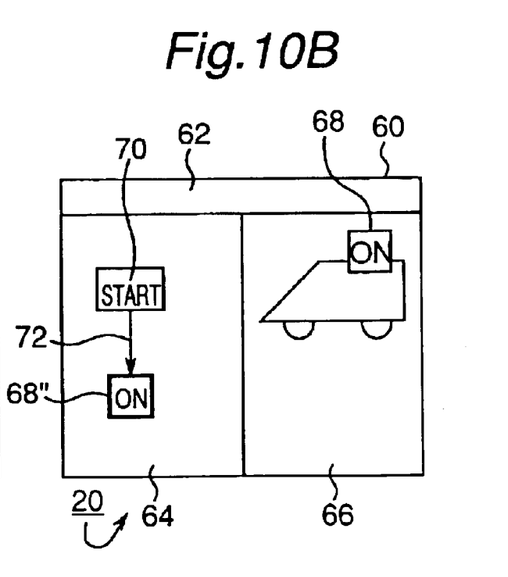

Next, in the step S110 shown in FIG. 8, the operations of so developed programs are inspected by simulating thereof in the program development environment 20. FIG. 10A illustrates the program developing area 64, in which the programs are developed as described above. Once starting to simulate the program, as illustrated in FIG. 10B, the program developing area 64 displays a flow of the operations as programmed, i.e., how the program is implemented. On the other hand, the device display area 66 shows a current status of each peripheral device 10, i.e., how the device icons 68 is operating. Preferably, the device driver 24 includes a plurality of device icons 68 in accordance with operations and/or current status of the peripheral device 10. As illustrated in FIG. 10B, the program is now simulated at the device icon (command) 68" in the program developing area 64, and the device icon 68 currently has the ON-status in the program displaying area 66.

After the simulation of the program, so developed and inspected program may be stored.

In the step S112 shown in FIG. 8, the developed programs and the software modules of the peripheral devices 10 may be transmitted to the controller 6 and may be implemented therein. However, it should be noted that the virtual system configured in the program developing environment 20 is identical to the actual system configured by physically connecting the controller 6 with the peripheral devices 10. In order to ensure this, the program developing environment 20 collects the GUIDs of the peripheral devices 10 through the controller 6 before conducting the step S112, then readily compares the device information retrieved based upon the actual GUIDs with one accompanied by the system virtually configured. If there is an inconsistency therebetween, the program developing environment 20 may alert the inconsistency to the user on the monitor 60.

Even if the developed programs and the software modules of the peripheral devices 10 are transmitted to the controller 6 without ensuring no inconsistency therebetween, no critical problem occurs. Because the program is designed to serve the function only if the peripheral devices 10 are actually connected with the controller 6, otherwise, the commands of the program relating to the unconnected peripheral devices 10 is simply disregarded. Therefore, this design results in the fail-safe preventing adverse operations.

Also, even if the controller 6 is connected with another peripheral device 10 which is not so intended, the programs have no command relating to the unintentionally connected peripheral device 10. Thus, no critical problem occurs.

The monitor 60 for displaying the simulation may be used to monitor the actual operation of the controller 6.

The operations of the program development environment 20 and the program implement environment 22 according to Embodiment 2 are described in the program codes adapted for the computer control. The program codes are stored in the memory (not shown) and implemented on the processor (not shown) of the computer. The program codes may be stored on any external storage mediums, such as a CD-ROM.

While an actual application system for an automated machine is configured according to Embodiment 1, a virtual application system for an automated machine is configured according to Embodiment 2. Another application system for an automated machine, in which both embodiments are merged, can readily be conceived.

Many advantages according to Embodiment 2 are obtained as indicated hereinafter.

The first advantage is that even if the peripheral devices 10 are not actually connected with the controller 6 or the programming device 2 (that is, even if the peripheral devices 10 are not available at hand), any programs related to the peripheral devices 10 can be developed. Also, in configuring the virtual application systems and/or developing programs, the device drivers 24 for the peripheral devices 10 to be connected are automatically linked with the controller 6. Therefore, the user is required to write only an essence of the program for the operation of the peripheral devices 10, eliminating the bothersome details to be set up. To this end, the function of their "Plug and Play" can effectively be exploited, and thus, the productivity for developing the control programs can remarkably be increased.

Simulations of the developed programs can avoid errors thereon. Since the programs are written in a form of the flowchart and the conditions of the present simulations are sequentially displayed in accordance with the flowchart, the user can easily recognize the simulations. Since the device drivers 24 may have a plurality of icons corresponding to operations or present status of the peripheral device 10 as described above, the device icons 68 may be displayed in accordance with the operation. Thus, the user can more easily understand the conditions of the operations of the virtually configured application system. Additionally, one or more pictures may be added on the monitor 60 as described above, which provides an image for what type of application systems for the automated machine will be set up. This provides the user with better comprehension with respect to the conditions of the operations of the virtually configured application system.

As indicated above, the monitor 60 for displaying the simulation may be used to monitor the actual operation of the controller 6. This eliminates the task to develop an another monitor for monitoring the developed control programs.

Since the present invention allows the development of the control programs even if the peripheral devices 10 are not available at hand, the work for developing the large-scale application system can be shared by a plurality of the users (programmers).

Embodiment 3

According to Embodiment 1 and 2, the peripheral devices 10 to be controlled are limited to actual devices physically connected with the controller 6. According to Embodiment 3, such objects to be controlled by the controller 6 is expanded to intangible one, which operates only on the monitor 60 and is so-called "a virtual assistant". Thus, the virtual assistant, which is referred to as a virtual manager 74 hereinafter, is intangible yet operable with the controller 6 on the monitor 60.

According to Embodiment 3, a virtual application system for an automated machine is configured in substantially the same manner as that according to Embodiment 2 as illustrated in FIG. 8.

Figure 11A:
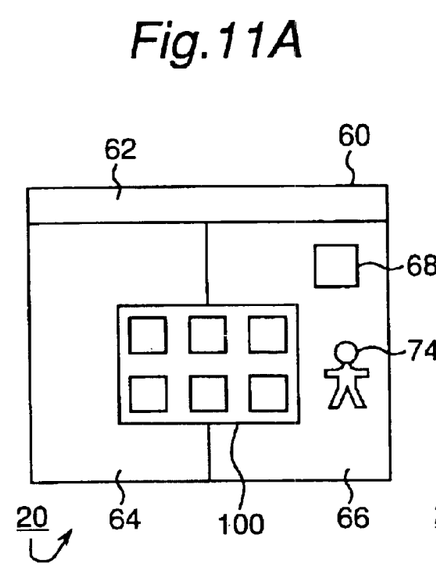
FIGS. 11A and 11B are schematic views of the program development environment together with a virtual assistance.
Figure 11B:
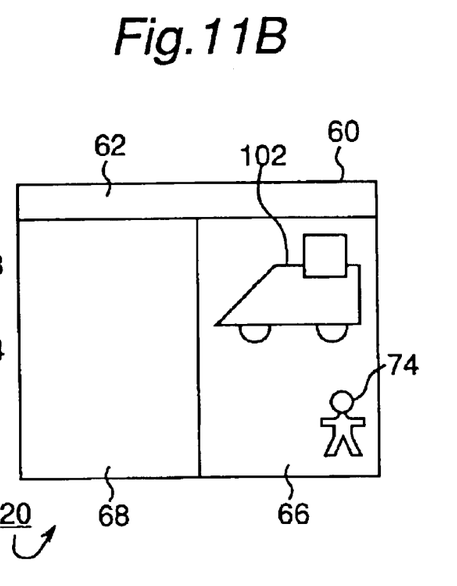

FIGS. 11A and 11B are schematic views of the program development environment 20 together with a virtual assistance according to Embodiment 3.

When the application system for an automated machine is configured, constructing the monitor 60 is an important work. Preferably, the monitor 60 not only has the function of monitoring the actual operations of the devices 10, but also has another functions. That is, the virtual manager 74 should be appeared on the monitor 60 to set up the application system as well as the device icons 68 for actual peripheral devices 10, so that the user can see the flow of the program in implementing thereof.

As described in Embodiment 2, the monitor 60 for displaying the simulation may be used to monitor the actual operation of the controller 6. According to Embodiment 2, the device icons 68 of the objects to be controlled are located in the device display area 66 and the program developing area 64 on the monitor 60. During simulating and monitoring the program, the operations of the objects 10 are indicated with the device icons 68' and 68. Similar to Embodiment 2, according to Embodiment 3, the virtual manger 74 is located in the device display area 66 and the program developing area 64 on the monitor 60. Thus, the virtual manager, which is operable only on the monitor, can be formed and used.

Figure 12A:
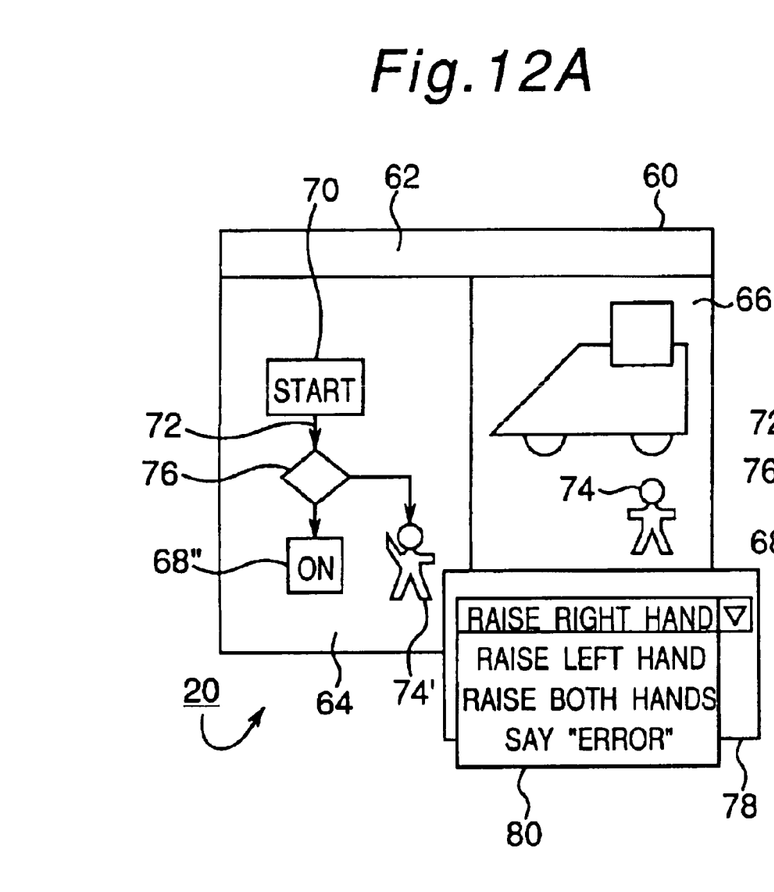
FIGS. 12A and 12B are schematic views of a program development environment during developing and monitoring programs.
Figure 12B:
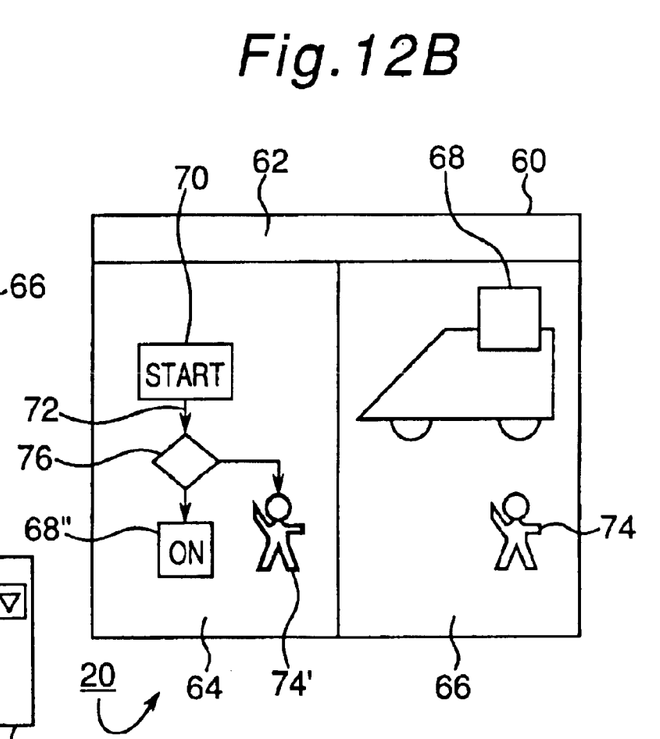

FIGS. 12A and 12B are schematic views of program development environment 20 according to Embodiment 3, in which virtual manager 74 is utilized to develop the program. A branch block 76 is utilized in FIG. 12. The dialogue box 78 of the object to be controlled (i.e., the virtual manager 74') describes the control process thereof. The double-click on the object (the virtual manager 74') opens the dialogue box 78. The user programs the operation of the objects by setting an alternative switch on the dialogue box according to Embodiment 1, or by selecting one of listed commands according to Embodiment 3. Both manners to program the operation of the object are acceptable and another manner may be incorporated.

As well as in Embodiment 1, a particular application software is utilized to describe the process of the virtual manager 74' in Embodiment 3, so that the user can program the more sophisticated operations of the virtual manager 74'.

In case where the controller 6 has no display device, as show in FIG. 2B, all of the developed programs except a portion thereof relating to the virtual manager 74 may be transmitted to the controller 6. Alternatively, all of the developed programs are transmitted to the controller 6 but the controller 6 disregards the portion thereof relating to the virtual manager 74.

Although the virtual manager (virtual assistant) 74 is the intangible object as indicated above, an identification code such as a GUID can be assigned to the virtual manager 74 as well as to the an actual peripheral device 10. The aforementioned ID code should be different from any other ones assigned to the actual objects 10. Thus, the objects 10 cannot be operated by the instructions for the virtual manager 74. This design results in the fail-safe preventing adverse operations of the objects 10.

FIG. 12B shows an example of the monitor 60 while implementing the developed programs. More particularly, FIG. 12B illustrates the monitor 60 monitoring the current status of the developed program where the developed program branches away from the "ON" command 68 to another procedure, in which "the virtual manager 74 raises its right hand". As shown in FIG. 12B, the virtual manager 74 raises its right hand.

The operations of the program development environment 20 and the program implement environment 22 according to Embodiment 3 are written in the program codes adapted for the computer control. These program codes are stored on the memory (not shown) and implemented on the processor (not shown) of the PC. These program codes may be stored on the external storage, such as a CD-ROM.

Many advantages according to Embodiment 3 are obtained as discussed hereinafter.

The user is provided through the monitor 60 with image information so as to instantly recognize more information than digital information. In addition, since the virtual assistant 74 is represented by a unique or distinct shape such as a shape of a person, the user can be easily provided with such information.

Several advantages according to Embodiment 1, 2 and 3 are described hereinafter.

The IEEE1394 is one of standards of an interface that can be utilized in the so-called "Home Networking devices". Thus, as discussed in the above embodiments of the present invention, any electrical appliances including a refrigerator, a microwave oven, an air conditioner and a room light, which incorporate the interface constructed based upon the IEEE1394, can be connected with the controller 6. The controller may be preprogrammed so as to operate in conjunction with a timer.

Further, according to the present invention, the "Hot Plug" function is exploited effectively, especially in the field such as the factory automation. Assume, for instance, a case where peripheral device 10 is to be added in or taken out of an application system, which is already configured and ready to operate for an automated machine. The conventional controller has to be powered down, and reprogrammed again by adding or deleting the procedures relating thereto. Contrary to this, according to the present invention, since the program can be modified (i.e., added or deleted) remaining the power of the peripheral devices 10, the burden of the user can substantially be reduced.

What is claimed is:

1. A system comprising:
   a controller;
   a monitor connected with said controller;
   at least one object to be controlled, said object being connected to said controller;
   development means for developing a program for said object;
   implementing means for implementing the program developed by said development means; and
   a software module uniquely assigned to said object, wherein said software module is automatically linked to said development means based on information stored on said object, said software module providing an icon procedure for displaying an icon for said object in a display area on said monitor, said software module further providing at least one of
   a description procedure used in said development means for describing a control process for said object, and
   an implementing procedure for implementing the control process developed in said development means for said object, wherein
      said object includes at least one device from which said development means acquires a global unique ID,
      said development means identifies said software module with the global unique ID, and
      said software module is stored within said object so that said development means acquires said software module from said controlled object.

2. The system according to claim 1, wherein said development means provides a display area on said monitor in which at least one icon is displayed, the icon representing one of said objects connected to said controller and an object to be connected to said controller.

3. The system according to claim 2, wherein the icon procedure displays a plurality of icons in the display area on said monitor, each icon illustrating current status of said object.

4. The system according to claim 2, wherein
   said development means provides a development area on said monitor, and
   a user copies the icon from the display area onto the development area, thereby developing the program.

5. The system according to claim 4, wherein, when said software module provides the description procedure, the user utilizes the description procedure for describing a control process for said object determining operation of said object, thereby developing the program.

6. The system according to claim 3, wherein said development means displays the icons in the display area, illustrates operation of said object while said implementing means implements the program, whereby said monitor is used for displaying operation of said object.

7. The system according to claim 4, wherein the user connects a plurality of the icons with each other to form a flowchart in the development area, thereby developing the program.

8. The system according to claim 4, wherein said object is connected to said controller through an interface including at least one of a Plug and Play function and a Hot Plug function.

9. The system according to claim 5, wherein the icon procedure displays a plurality of icons in the display area on said monitor, each icon illustrating operation of said object.

10. The system according to claim 9, wherein said development means displays the icons in the display area, and simulates operation of said object while execution of the program is simulated, whereby said monitor is used for displaying simulation of said object.

11. A system comprising:
a controller;
a monitor connected with said controller;
at least one object to be controlled, said object being connected to said controller;
development means for developing a program for said object;
implementing means for implementing the program developed by said development means; and
a software module uniquely assigned to said object, wherein said software module is automatically linked to said development means based on information stored on said object, said software module providing an icon procedure for displaying an icon for said object in a display area on said monitor, said software module further providing at least one of
a description procedure used in said development means for describing a control process for said object, and
an implementing procedure for implementing the control process developed in said development means for said object, wherein
said object includes at least one device from which said development means acquires a global unique ID,
said development means identifies said software module with the global unique ID,
said development means provides a display area on said monitor in which at least one icon is displayed, the icon representing one of said objects connected to said controller and an object to be connected to said controller,
said development means provides a development area on said monitor,
a user copies the icon from the display area onto the development area, thereby developing the program, and
said implementing means sends messages to and/or receives messages from said object according to the program developed.

12. A storage medium storing a computer program for execution on a system which comprises
a controller,
a monitor connected to said controller,
at least one object to be controlled, said object being connected to said controller,
development means for developing a program for said controlled object,
implementing means for implementing the program developed by said development means, and
a software module uniquely assigned to said object, wherein the software module is automatically linked to the development means based on information stored on the object, said software module including an icon procedure for displaying an icon for said object in a display area on said monitor, a description procedure for describing a control process for said object, and an implementing procedure for implementing the control process developed for said object,
said system including said object including at least one device, wherein said software module is stored within said object so that said development means acquires said software module from said controlled object,
said computer program comprising:
a first subprocess in which said development means acquires a global unique ID from said device;
a second subprocess in which said development means identifies said software module with the global unique ID;
a third subprocess in which said development means provides a display area on the monitor, in which at least one icon is displayed, the icon representing one of said object connected to said controller and an object to be connected to said controller;
a fourth subprocess in which said development means provides a development area on said monitor; and
a fifth subprocess in which the icon is copied from the display area onto the development area, thereby developing an application program.

* * * * *